United States Patent
Lai et al.

(10) Patent No.: US 11,795,058 B2
(45) Date of Patent: Oct. 24, 2023

(54) SILICON DIOXIDE COMPOSITE PARTICLE WITH FAR-INFRARED RADIOACTIVITY; PRECURSOR OF THE SAME AND APPLICATION THEREOF

(71) Applicants: National Chi Nan University, Puli Township, Nantou County (TW); Great Chain Chemical Ltd., Taipei (TW)

(72) Inventors: Long-Li Lai, Puli Township, Nantou County (TW); Cheng-Hua Lee, Puli Township, Nantou County (TW); Yao-Chih Lu, Puli Township, Nantou County (TW); Ya-Lin Chang, Puli Township, Nantou County (TW)

(73) Assignees: NATIONAL CHI NAN UNIVERSITY, Nantou County (TW); GREAT CHAIN CHEMICAL LTD., Taipei (TW)

( * ) Notice: Subject to any disclaimer, the term of this patent is extended or adjusted under 35 U.S.C. 154(b) by 560 days.

(21) Appl. No.: 16/531,947

(22) Filed: Aug. 5, 2019

(65) Prior Publication Data
US 2020/0180967 A1  Jun. 11, 2020

(30) Foreign Application Priority Data
Dec. 10, 2018 (TW) .................................. 107144357

(51) Int. Cl.
*C01B 33/12* (2006.01)
*C07F 7/18* (2006.01)

(52) U.S. Cl.
CPC .......... *C01B 33/126* (2013.01); *C07F 7/1804* (2013.01); *C01P 2006/88* (2013.01)

(58) Field of Classification Search
None
See application file for complete search history.

(56) References Cited

U.S. PATENT DOCUMENTS

| | | | |
|---|---|---|---|
| 2009/0148578 A1* | 6/2009 | Kondoh | C04B 18/101 426/531 |
| 2010/0162494 A1* | 7/2010 | Muller | C07F 7/1804 977/773 |
| 2018/0127592 A1* | 5/2018 | Lei | C23C 16/45553 |
| 2018/0134565 A1* | 5/2018 | Hindelang | B01J 13/0065 |
| 2018/0251379 A1* | 9/2018 | Benjelloun Mlayah | B01D 11/0292 |
| 2018/0370835 A1* | 12/2018 | Otter | C03C 3/06 |
| 2019/0002325 A1* | 1/2019 | Czermak | C01B 33/126 |

* cited by examiner

*Primary Examiner* — Guinever S Gregorio
(74) *Attorney, Agent, or Firm* — MUNCY, GEISSLER, OLDS & LOWE, P.C.

(57) ABSTRACT

The present invention relates to a silicon dioxide composite particle with far-infrared radioactivity, which is formed by the hydrolysis, condensation and polymerization of an organic silane precursor having the structure of the formula (I) with a tetra-alkoxysilane. The high stability of organic silane precursor compounds and the low biotoxicity of silicon dioxide composite particles make the present far-infrared radioactive silicon dioxide composite particles of great potential for extensive use in related bio-products.

$$A-R^1-Si(OR^2)_3 \qquad \text{Formula (I)}$$

7 Claims, 1 Drawing Sheet

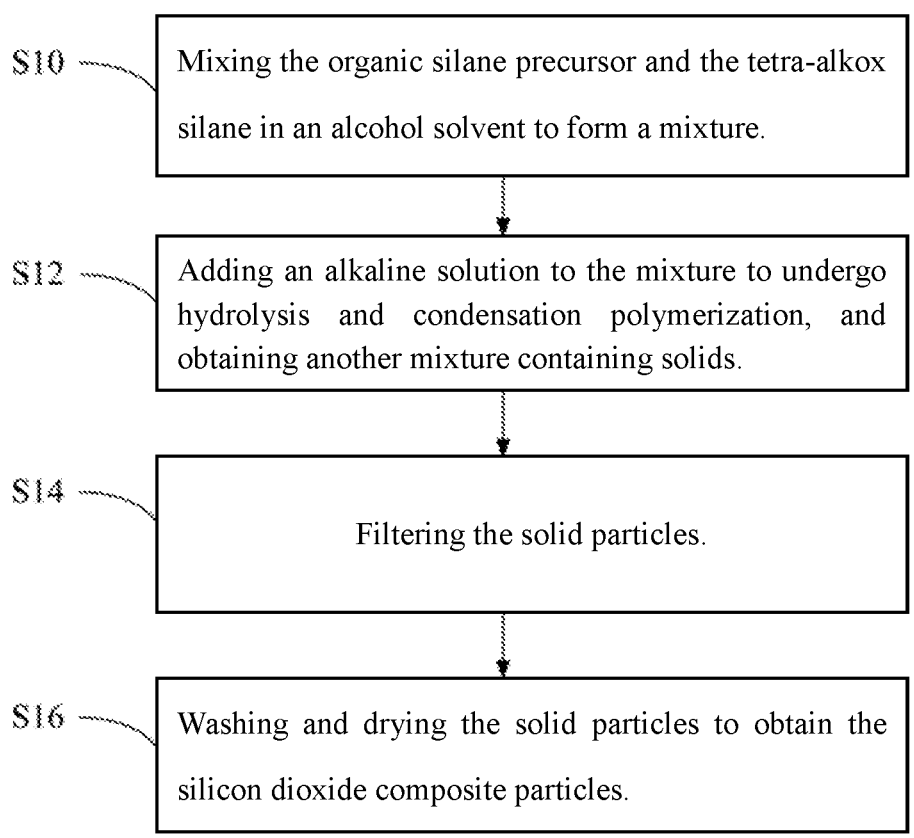

SILICON DIOXIDE COMPOSITE PARTICLE WITH FAR-INFRARED RADIOACTIVITY; PRECURSOR OF THE SAME AND APPLICATION THEREOF

CROSS-REFERENCE TO RELATED APPLICATION

BACKGROUND OF THE INVENTION

Technical Field of the Invention

The present disclosure relates to a silicon dioxide composite particle and in particular to a silicon dioxide composite particle with far-infrared radiation and low biotoxicity, which renders its extensive use in biological products.

Background

Far-infrared radiation refers to radiation with wavelengths ranging from 4.0 µm and 1000 µm, which is in the non-visible spectrum. Specifically, radiation with wavelengths between 4 and 14 µm affects the physical or chemical properties of organisms; it is closely related to the growth of organisms and is also known as the light of life.

For example, there are many functional groups in human cells that can absorb the energy of far-infrared radiation with wavelengths between 4 and 14 µm, such as the hydroxyl and carbonyl groups. The absorption wavelength for water molecules is about 6.27 µm, and after absorbing the radiation, the water molecule will rotate, which breaks the hydrogen bonds between water molecules so that the water-clusters turn into individual water molecules. The individual water molecules can easily enter the cells to promote further intracellular biochemical reactions, accelerate blood circulation and improve nutrient absorption and metabolism. Therefore, many far-infrared materials have been developed for these purposes.

The far-infrared materials mainly absorb thermal energy in the environment and then convert the thermal energy into far-infrared radiation. Most of the conventional far-infrared materials are inorganic nano materials, such as oxides, carbides, borides, silicides or nitrides. However, all of the above materials are natural or man-made minerals or compounds with a particular percentage of metal. These materials are further processed by high-temperature sintering and then ground to far-infrared nanoparticles having good far-infrared radiation. Nevertheless, since the far-infrared radiation compound is a nano-sized particle, it may enter the living body through respiration and the trace amounts of heavy metal may cause damage to the organism. Thus, the application thereof is inherently limited. In addition, the inorganic nano materials may cause allergic reactions or irritations when in direct contact with human skin.

In view of the above-mentioned issues of the conventional far-infrared materials, it is necessary to improve the properties of the far-infrared materials to boost their market potential and wider applicability.

SUMMARY OF INVENTION

The present disclosure provides an organic silane precursor. When the organic precursor undergoes a polycondensation reaction with tetra-alkoxysilane, the precursor bonds to the hydroxyl group exposed on the surface of the silicon dioxide particles, thereby forming a long carbon-chain structure which comes in direct contact with the skin and reduces the irritability caused by the hydroxyl group.

In addition, the organic precursor provided by the present disclosure is comprised of a long carbon-chain structure which generates a steric barrier to reduce the mutual polymerization between the organic precursors. Accordingly, the organic precursor is highly stable.

Therefore, one of the aspects of the present disclosure is to provide an organic silane precursor in the preparation of a silicon dioxide composite particle, wherein the organic precursor is of the formula (I) $A\text{-}R^1\text{-}Si(OR^2)_3$, wherein $R^1$ is a $C_{2\text{-}4}$ alkylene group, $R^2$ is a $C_{1\text{-}2}$ alkyl group, A is selected from

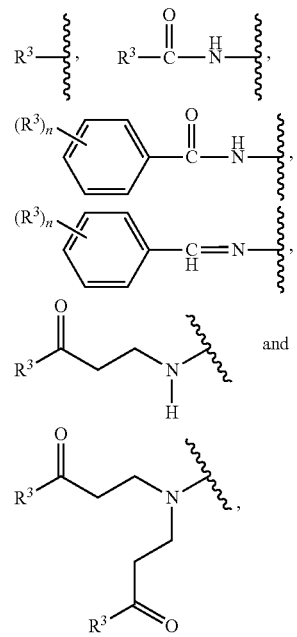

$R^3$ is selected from an unsubstituted $C_{1\text{-}18}$ linear or branched alkyl group or alkoxyl group, and n is 1 to 5.

According to some implementations of the present disclosure, the alkoxyl group is

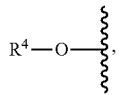

wherein $R^4$ is selected from an unsubstituted $C_{1\text{-}18}$ linear or branched alkyl group.

A further aspect of the present disclosure relates to a method for using the precursor of the above formula (I) to prepare a silicon dioxide composite particle. The method involves the following steps: mixing the organic silane precursor and tetra-alkoxy silane in an alcohol solvent to form a mixture; adding an alkaline solution to the mixture to undergo hydrolysis and condensation polymerization, and obtaining another mixture with solids; filtering, washing and drying the solid particles to obtain the silicon dioxide composite particles.

According to some embodiments of the present disclosure, the tetra-alkoxy silane is tetra ethoxysilane.

According to some embodiments of the present disclosure, the alcohol solvent is ethanol solution.

According to some embodiments of the present disclosure, the alkaline solution is ammonia solution.

A further aspect of the present disclosure relates to silicon dioxide composite particles with far-infrared radioactivity, which is prepared from the above method for preparing the silicon dioxide composite particles.

BRIEF DESCRIPTION OF THE DRAWINGS

The sole FIGURE is a flow chart showing the method for preparing the silicon dioxide composite particles according to one of the embodiments of the present disclosure.

DETAILED DESCRIPTION OF THE INVENTION

Definition

In the present disclosure, the term "precursor" means a precursor compound that undergoes a particular chemical reaction, causing a change in the chemical structure, to obtain a particular physical property or chemical property, wherein the chemical reaction includes hydrolysis, polymerization or condensation.

In the present disclosure, the term "alkyl group" means a linear chain, branched chain or saturated aliphatic group having 1 to about 18 carbons. The alkyl group may include any number of the carbon atoms, and the number of carbon atoms may be further defined. For example, $C_{1-2}$ means an alkyl group having 1 or 2 carbon atoms. $C_{1-3}$ means an alkyl group having 1 to 3 carbon atoms. $C_{1-4}$ means an alkyl group having 1 to 4 carbon atoms. $C_{2-4}$ means an alkyl group having 2 to 4 carbon atoms. For example, the $C_{1-6}$ alkyl group includes, but is not limited to, methyl, ethyl, propyl, isopropyl, butyl, isobutyl, sec-butyl, tert-butyl, pentyl, isopentyl, hexyl, etc. The alkyl group can also refer to an alkyl group having up to 18 carbon atoms including, but not limited to, heptyl, octyl, nonyl, decyl, etc.

In the present disclosure, the term "alcohol" means an organic compound having a hydroxyl group (—OH) bonded to a carbon atom. For example, methanol, propanol, isopropanol, butanol, octanol, isooctyl alcohol, ethylene glycol, etc.

In the present disclosure, the term "alkaline solution" means a solution with a pH value of more than 7 or the concentration of hydroxide ions is higher than the concentration of hydrogen ions at room temperature. For example, sodium hydroxide solution, potassium hydroxide solution, sodium hydrogencarbonate solution, potassium hydrogencarbonate solution, sodium carbonate solution, potassium carbonate solution, triethylamine, pyridine, N,N-diisopropylethylamine, 4-dimethylaminopyridine, 3-methylpyridine, or 2,4,6-trimethylpyridine, etc.

In the present disclosure, the term "composite particle" means a functional substance, prepared by hydrolysis, condensation, polymerization, or any chemical reaction of a specific precursor and a particular metal/metalloid/nonmetal particle, and also any product directly or indirectly obtained from the composite particle.

In view of the problems with the conventional silicon dioxide composite particles, including uneven particle size distribution, biotoxicity and allergenicity, the present disclosure proposes solutions for such technical problems. The features of the present disclosure and the achieved efficacy will be explained in detail with reference to the detailed description and preferred embodiments.

The organic precursor for preparing the silicon dioxide composite particles.

In one embodiment, the present disclosure provides a compound for the formula (I):
$A-R^1—Si(OR^2)_3$, wherein $R^1$ is $C_{2-4}$ alkylene group, $R^2$ is $C_{1-2}$ alkyl group, A is selected from

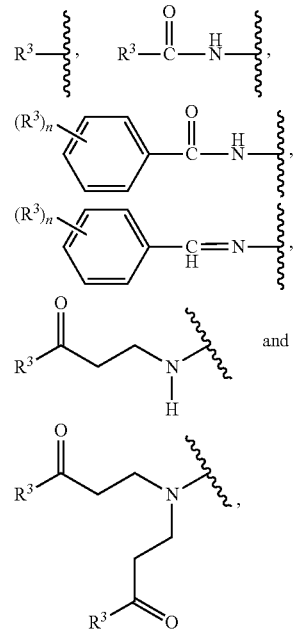

$R^3$ is selected from an unsubstituted $C_{1-18}$ linear or branched alkyl group or alkoxyl group, and the number of the group can be 1, 2, 3, 4 or 5. The linear alkyl group can be, for example, methyl, ethyl, propyl, butyl, pentyl or hexyl. The branched alkyl group can be, for example, isopropyl, isobutyl, sec-butyl, tert-butyl, isopentyl. The alkoxyl group can be, for example, methoxy, ethoxy, propoxy, isopropoxy, butoxy, 2-butoxy, isobutoxy, sec-butoxy, tert-butoxy, pentyloxy or hexyloxy, etc.

When silicon dioxide composite particles are obtained from the organic precursor and the silicon dioxide particles by a polycondensation reaction, $A-R^1—Si(OR^2)_3$ bonds to a hydroxyl group exposed on the surface of the silicon dioxide particles, thereby reducing the irritability caused by the hydroxyl group and reducing the biological toxicity of the silicon dioxide composite particles to the organisms, so that the applicability of the silicon dioxide composite particles can be increased.

Further, in the structure of the organic silane precursor, $R^3$ may be an unsubstituted $C_{1-18}$ linear or branched alkyl or alkoxyl group, which effectively provides a steric barrier to prevent the $A-R^1—Si(OR^2)_3$ from intermolecular self-polymerization to form nano-particles. Consequently, there is greater stability of the organic silane precursor.

Preparation of the Silicon Dioxide Composite Particles

A further aspect of the present disclosure provides a method for preparing silicon dioxide composite particles. The method consists of the following steps:

Step S10: mixing the organic silane precursor and the tetra-alkox silane in an alcohol solvent to form a mixture;

Step S12: adding an alkaline solution to the mixture to undergo hydrolysis and condensation polymerization, and obtaining another mixture containing solids;

Step S14: filtering the solid particles; and

Step S16: washing and drying the solid particles to obtain the silicon dioxide composite particles.

In the method, as shown in step S10, the organic silane precursor and tetra-alkox silane were added to the alcohol solvent to form a mixture. The properties of the organic silane precursor are as described above. The tetra-alkox silane may be, for example, tetra ethoxysilane, but is not limited thereto. The alcohol solvent may be, but is not limited to, an ethanol solution.

Next, as shown in step S12, the alkaline solution is added to the mixture obtained from step S10 to undergo hydrolysis and condensation polymerization. The alkaline solution may be an ammonia solution, but is not limited thereto. In this step, the tetra-alkox silane forms a silicon dioxide material, and the —Si(OR$^2$)$_3$ in the organic precursor structure is hydrolyzed to —Si(OH)$_3$. The organic silane precursor and the silicon dioxide material undergo condensation and polymerization between the —Si(OH)$_3$ of the organic precursor and the hydroxyl group on the surface of the silicon dioxide material, so that the hydroxyl group on the surface of the silicon dioxide particles is replaced by the groups of the organic precursor.

Further, as shown in steps S14 and S16, another mixture containing solids obtained from step S12 is filtered, washed and dried to obtain the silicon dioxide composite particles. In these two steps, the methods for filtration, washing, and drying are well known in the art and are thus not described herein.

Silicon Dioxide Composite Particles with Far-Infrared Radioactivity

In another aspect, the present disclosure provides a method to prepare silicon dioxide composite particles with far-infrared radioactivity. The silicon dioxide composite particles with lower biological toxicity are due to the organic silane precursor of the present disclosure. Accordingly, the silicon dioxide composite particles can be applicable to the products that are used as far-infrared treatments or cures.

The following embodiments are given by way of illustration to help those skilled in the art to fully understand the spirit of the present application. Hence, it should be noted that the present application is not limited to the embodiments herein and can be realized by various forms.

EMBODIMENT

Embodiment 1

Preparation of
N-(3-(triethoxysilyl)propyl)dodecanamide

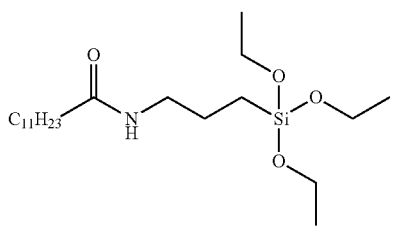

(1)

A single neck reaction flask with 100 mL volume was provided. 10 mL of dry dichloromethane and 2.22 g of (N-(3-(triethoxysilyl)propyl)propylamine (10 mmol) were added to the single neck reaction flask to give an initial solution, which was placed in an ice-water bath at 0° C. Next, 2.20 g of dodecanoyl chloride (10 mmol) was slowly dropped into the initial solution. After 20 minutes of reaction time, 1.12 g of triethylamine (11 mmol) was slowly added to obtain a mixture. After 2 hours of reaction time, the mixture was poured into a 250 mL extraction flask, and then washed twice with 30 mL of a 0.5 M sodium hydroxide solution, and further washed once with 50 mL of water to obtain an organic layer solution. The organic layer solution was added to anhydrous magnesium sulfate and then filtered. After removing the organic solvent with a rotary evaporator (PAMCHUM SCIENTIFIC CORP., R-2000S-B1), N-(3-(triethoxysilyl)propyl) dodecanamide (3.55 g, 8.8 mmol) was obtained.

$^1$H NMR (300 MHz, CDCl$_3$), δ(ppm): 0.59 (t, J=7.8 Hz, 2H, CH$_2$—Si), 0.83 (t, J=6.9 Hz, 3H, 1×CH$_3$), 1.18 (t, J=7.2 Hz, 9H, 3×CH$_3$—COSi), 1.21 (s, 16H, 8×CH$_2$), 1.5~31.63 (m, 4H, 1×CH$_2$+1×CH$_2$—CSi), 2.11 (t, J=7.8 Hz, 2H, 1×CH$_2$—C=O), 3.20 (q, J=6.0 Hz, 2H, 1×CH$_2$—N), 3.78 (q, J=6.9 Hz, 6H, 3×CH$_2$—OSi), 5.84 (s, 1H, 1×NH). MS: m/z 404.3 (M+H)$^+$.

Embodiment 2

Preparation of
2-ethyl-N-(3-(triethoxysilyl)propyl)hexanamide

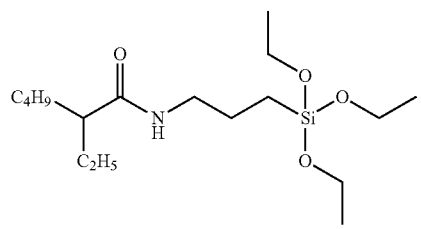

(2)

The dodecanoyl chloride in Embodiment 1 was replaced by 2-ethyl hexanoyl chloride, and the other steps were the same as those in Embodiment 1. After the reaction was complete, 2-ethyl-N-(3-(triethoxysilyl)propyl)hexanamide (2.85 g, 8.2 mmol) was obtained.

$^1$H NMR (300 MHz, CDCl$_3$), δ(ppm): 0.60 (t, J=7.8 Hz, 2H, CH$_2$—Si), 0.84 (t, J=6.9 Hz, 6H, 2×CH$_3$), 1.12~1.48 (m, 13H, 3×CH$_3$—COSi+2×CH$_2$), 1.53~1.64 (m, 4H, 2×CH$_2$), 1.81-1.90 (m, 1H, 1×CH), 3.23 (q, J=6.6 Hz, 2H, 1×CH$_2$—N), 3.78 (q, J=6.9 Hz, 6H, 3×CH$_2$—OSi), 5.79 (s, 1H, 1×NH). MS: m/z 348.3 (M+H)$^+$.

Embodiment 3

Preparation of
N-(3-(triethoxysilyl)propyl)-4-hexylbenzamide

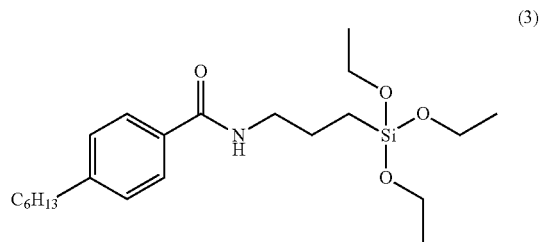

(3)

The dodecanoyl chloride in Embodiment 1 was replaced by 4-hexyl-benzoylchloride, and the other steps were the same as those in Embodiment 1. After the reaction was complete, N-(3-(triethoxysilyl)propyl)-4-hexylbenzamide (3.56 g, 8.7 mmol) was obtained.

$^1$H NMR (300 MHz, CDCl$_3$), δ(ppm): 0.70 (t, J=7.8 Hz, 2H, CH$_2$—Si), 0.87 (t, J=6.6 Hz, 3H, 1×CH$_3$), 1.15~1.47 (m, 15H, 3×CH$_3$—COSi+3×CH$_2$), 1.52~1.81 (m, 4H, 2×CH$_2$), 2.63 (t, J=7.5 Hz, 2H, 1×CH$_2$), 3.45 (q, J=6.6 Hz, 2H, 1×CH$_2$—N), 3.82 (q, J=6.9 Hz, 6H, 3×CH$_2$—OSi), 7.22 (d, J=8.1 Hz, 2H, Ar—H), 7.67-7.81 (br, 3H, Ar—H+1×NH). MS: m/z 410.6 (M+H)$^+$.

Embodiment 4

Preparation of ethyl(3-(triethoxysilyl)propyl)carbamate (4)

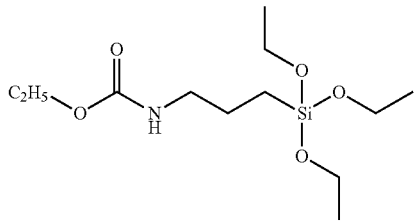

The dodecanoyl chloride in Embodiment 1 was replaced by ethyl chloroformate, and the other steps were the same as those in Embodiment 1, and thus will not be described herein. After the reaction was complete, ethyl(3-(triethoxysilyl)propyl)carbamate (2.32 g, 7.9 mmol) was obtained.

$^1$H NMR (300 MHz, CDCl$_3$), δ(ppm): 0.50 (t, J=8.1 Hz, 2H, 1×CH$_2$—Si), 1.10 (t, J=6.9 Hz, 12H, 3×CH$_3$—COSi+1×CH$_3$), 1.44~1.54 (m, 2H, 1×CH$_2$—CSi), 3.03 (q, J=6.6 Hz, 2H, 1×CH$_2$—N), 3.69 (q, J=6.9 Hz, 6H, 3×CH$_2$—OSi), 3.97 (q, J=6.9 Hz, 2H, 1×CH$_2$—OC=O), 5.09 (s, 1H, 1×NH). MS: m/z 294.0 (M+H)$^+$.

Embodiment 5

Preparation of N-(2-ethylhexyl)propanoate-3-(triethoxysilyl)propyl-1-amine (5)

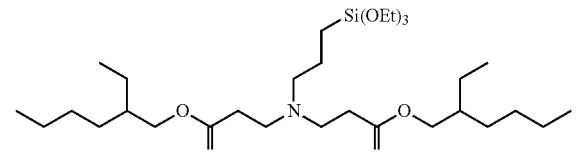

The dodecanoyl chloride in Embodiment 1 was replaced by 2-ethylhexyl acrylate, and the other steps were the same as those in Embodiment 1. After the reaction was complete, N-(2-ethylhexyl) propanoate-3-(triethoxysilyl) propyl-1-amine (2.96 g, 7.3 mmol) was obtained.

$^1$H NMR (300 MHz, CDCl$_3$), δ(ppm): 0.58 (t, J=8.4 Hz, 2H, 1×CH$_2$—Si), 0.78~0.90 (br, 6H, 2×CH$_3$), 1.17 (t, J=7.2 Hz, 9H, 3×CH$_3$—CSi), 1.21~1.39 (br, 8H, 4×CH$_2$), 1.42-1.61 (m, 3H, 1×CH$_2$+1×CH), 2.46 (t, J=6.3 Hz, 2H, 1×CH$_2$), 2.56 (t, J=7.2 Hz, 2H, 1×CH$_2$), 2.84 (t, J=6.6 Hz, 2H, 1×CH$_2$), 3.76 (q, J=6.9 Hz, 6H, 3×CH$_2$—OSi), 3.91-4.07 (m, 2H, 1×CH$_2$). MS: m/z 406.3 (M+H)$^+$.

Embodiment 6

Preparation of N-Di((2-ethylhexyl)propanoate)-3-(triethoxysilyl)propyl-1-amine (6)

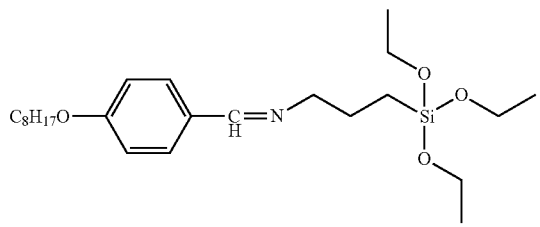

The dodecanoyl chloride (10 mmol) in Embodiment 1 was replaced by 2-ethylhexyl acrylate (20 mmol), and the other steps were the same as those in Embodiment 1. After the reaction was complete, N-Di ((2-ethylhexyl)propanoate)-3-(triethoxysilyl)propyl-1-amine (4.60 g, 7.8 mmol) was obtained.

$^1$H NMR (300 MHz, CDCl$_3$), δ(ppm): 0.61 (t, J=8.4 Hz, 2H, 1×CH$_2$—Si), 0.81~0.91 (br, 12H, 4×CH$_3$), 1.20 (t, J=7.2 Hz, 9H, 3×CH$_3$—CSi), 1.21~1.41 (br, 16H, 8×CH$_2$), 1.46-1.64 (m, 4H, 1×CH$_2$+2×CH), 2.49 (t, J=6.3 Hz, 4H, 2×CH$_2$), 2.59 (t, J=7.2 Hz, 2H, 1×CH$_2$), 2.85 (t, J=6.6 Hz, 4H, 2×CH$_2$), 3.79 (q, J=6.9 Hz, 6H, 3×CH$_2$—OSi), 3.92-4.09 (m, 4H, 2×CH$_2$). MS: m/z 590.4 (M+H)+.

Embodiment 7

Preparation of N-(4-(octyloxy)benzylidene)-3-(triethoxysilyl)propan-1-amine (7)

A single neck reaction flask with 50 mL volume was provided. 2.22 g of 3-(triethoxysilyl)propylamine (10 mmol), 2.34 g of 4-octyloxy benzaldehyde (10 mmol), and 10 mL of toluene solution were added into the single neck reaction flask to obtain a mixture. After 5 hours of reaction time at a temperature of 40° C., the toluene solution was removed with a rotary evaporator to obtain N-(4-(octyloxy)benzylidene)-3-(triethoxysilyl)propan-1-amine (3.20 g, 9.2 mmol).

$^1$H NMR (300 MHz, CDCl$_3$), δ(ppm): 0.66 (t, J=8.4 Hz, 2H, 1×CH$_2$—Si), 0.87 (t, J=6.6 Hz, 3H, 1×CH$_3$), 1.21 (t, J=6.9 Hz, 9H, 3×CH$_3$—COSi), 1.25~1.52 (m, 10H, 5×CH$_2$) 1.71-1.85 (m, 4H, 2×CH$_2$), 3.54 (t, J=6.9 Hz, 2H, 1×CH$_2$—N), 3.81 (q, J=6.9 Hz, 6H, 3×CH$_2$—OSi), 3.95 (t, J=6.6 Hz, 2H, 1×CH$_2$—O), 6.88 (d, J=8.7 Hz, 2H, Ar—H), 7.63 (d, J=8.7 Hz, 2H, Ar—H), 8.17 (s, 1H, 1×CH). MS: m/z 348.3 (M+H)$^+$.

Embodiment 8

Preparation of Silicon Dioxide Composite Particles by Using Example 1 as a Precursor 2.0 g (5 mmol) of (N-(3-(triethoxysilyl)propyl)dodecanamide from Embodiment 1, 20.8 g (100 mmol) of tetraethoxysilane and 20 mL of ethanol were stirred uniformly for 3 minutes. Next, 22 mL of a 35% ammonia solution was slowly added. After 24 hours of reaction time, the filtration processed a solid. The solid was washed twice with hot water and then dried to provide 6.4 g of silicon dioxide composite particles with a yield of 85.2%.

Embodiment 9

Preparation of Silicon Dioxide Composite Particles by Using Example 2 as a Precursor The N-(3-(triethoxysilyl)propyl)dodecanamide from Embodiment 1 was replaced by 2-ethyl-N-(3-(triethoxysilyl)propyl)hexanamide from Embodiment 2, and 6.3 g of silicon dioxide composite particles were obtained; the yield of the product was 85.2%. The other steps were the same as those in Embodiment 8.

Embodiment 10

Preparation of Silicon Dioxide Composite Particles by Using Example 3 as a Precursor The N-(3-(triethoxysilyl)propyl)dodecanamide from Embodiment 1 was replaced by N-(3-(triethoxysilyl)propyl)-4-hexylbenzamide from Embodiment 3, and 5.65 g of silicon dioxide composite particles were obtained; the yield was 71.4%. The other steps were the same as those in Embodiment 8.

Embodiment 11

Preparation of Silicon Dioxide Composite Particles by Using Example 4 as a Precursor The N-(3-(triethoxysilyl)propyl)dodecanamide from Embodiment 1 was replaced by ethyl(3-(triethoxysilyl)propyl)carbamate from Embodiment 4, and 5.25 g of silicon dioxide composite particles were obtained; the yield was 75.6%. The other steps were the same as those in Embodiment 8.

Embodiment 12

Preparation of Silicon Dioxide Composite Particles by Using Example 5 as a Precursor The N-(3-(triethoxysilyl)propyl)dodecanamide from Embodiment 1 was replaced by N-(2-ethylhexyl)propanoate-3-(triethoxysilyl)propyl-1-amine from Embodiment 5, and 6.1 g of silicon dioxide composite particles were obtained; the yield was 81.1%. The other steps were the same as those in Embodiment 8.

Embodiment 13

Preparation of Silicon Dioxide Composite Particles by Using Example 6 as a Precursor The N-(3-(triethoxysilyl)propyl)dodecanamide from Embodiment 1 was replaced by N-Di((2-ethylhexyl)propanoate)-3-(triethoxysilyl)propyl-1-amine from Embodiment 6, and 6.7 g of silicon dioxide composite particles were obtained; the yield was 79.4%. The other steps were the same as those in Embodiment 8.

Embodiment 14

Preparation of Silicon Dioxide Composite Particles by Using Example 7 as a Precursor The N-(3-(triethoxysilyl)propyl)dodecanamide from Embodiment 1 was replaced by N-(4-(octyloxy)benzylidene)-3-(triethoxysilyl)propan-1-amine from Embodiment 7, and 6.3 g of silicon dioxide composite particle were obtained; the yield was 82.3%. The other steps were the same as those in Embodiment 8.

Embodiment 15

Preparation of Silicon Dioxide Composite Particles by Using N-Propyltriethoxysilane as a Precursor The N-(3-(triethoxysilyl)propyl)dodecanamide from Embodiment 1 was replaced by commercially available N-propyltriethoxysilane, and 6.2 g of silicon dioxide composite particles were obtained; the yield was 95.2%.

Embodiment 16

Preparation of Silicon Dioxide Composite Particles by Using N-Octyltriethoxysilane as a Precursor The N-(3-(triethoxysilyl)propyl)dodecanamide from Embodiment 1 was replaced by commercially available N-octyltriethoxysilane, and 6.6 g of silicon dioxide composite particles were obtained; the yield was 96.1%.

Comparative Example 1

20.8 g (100 mmol) of tetraethoxysilane and 30 mL of ethanol were uniformly stirred for 3 minutes. Next, 22 mL of a 35% ammonia solution was slowly added. After 24 hours of reaction time, filtration was carried out to process a solid. The solid was washed twice with hot water, and then dried; 5.1 g of silicon dioxide particles were obtained, with a yield of 84.9%.

Embodiment 17

Test of Far-Infrared Emissivity (%)

Each of the silicon dioxide composite particles from Examples 8 to 16, respectively, was prepared on a 15×15 mm sheet-like sample for testing. The test samples were measured using a far-infrared emissivity analyzer (label: Japan Sensor Corporation; model: TSS-5X). The measurement conditions are described below. The measurement temperature was 25° C. The measurement wavelength range was between 2 μm and 22 μm.

As shown in Table 1, the far-infrared emissivity of the silicon dioxide composite particles from Embodiments 8 to 16 was greater than 90%. Further, each silicon dioxide composite particle prepared from the precursors from Embodiments 1-7 of the present disclosure, respectively, had a far-infrared emissivity equivalent to, or even better than the far-infrared emissivity of the silicon dioxide composite particles prepared from a commercially available precursor. Accordingly, the precursors from Embodiments 1-7 can indeed provide silicon dioxide composite particles with far-infrared radioactivity.

TABLE 1

|  | Embodiment 8 | Embodiment 9 | Embodiment 10 | Embodiment 11 | Embodiment 12 |
|---|---|---|---|---|---|
| far-infrared emissivity | 93% | 94% | 98% | 95% | 98% |

|  | Embodiment 13 | Embodiment 14 | Embodiment 15 | Embodiment 16 | Comparative example 1 |
|---|---|---|---|---|---|
| far-infrared emissivity | 97% | 91% | 93% | 94% | 95% |

Embodiment 18

Cytotoxicity Test A

This embodiment is a cytotoxicity test using the Agar Diffusion Method. Mouse fibroblast cells (L929, CCRC 60091 NCTN Clone 929, of strain L) were implanted into each well of a 6-well plate and a minimum essential medium (MEM) containing 10% serum and 1% antibiotic was added to each well for cell culture. After the cells grew a sub-confluent monolayer, 2 mL of 1.5% agar was added. After the agar solidified, the test sample of the silicon dioxide composite particles was added to one of the wells, and no other sample of the composite particles was added to the remaining wells to act as a control group. Next, the 6-well plate was placed in an incubator with 5% carbon dioxide at 37° C. for 24 hours, then stained with Neutral Red and then the number of viable cells was counted. One sample was investigated 3 times in total, and the qualitative results were determined according to ISO10993-5 and ASTM F895-11. The individual results of the three tests were recorded and the average value of these results was taken as the qualitative score. The Response Index (RI) is obtained based on the ratio of cell death and cell deformation. The lower the RI value is, the lower the cytotoxicity. The test result in which R.I.>1/1 means that the sample is cytotoxic. In order to describe the process of the investigation clearly, the product from Embodiment 8 will be used as an example. The product from Embodiment 16 and the product from Comparative Example 1 were also prepared for testing by the same process. 0.2 g of the product from Embodiment 8 was mixed with a minimum essential medium containing 10% serum and 1% antibiotic to form a solution with a 0.2 g/mL concentration. The reaction index of the testing sample from Embodiment 8 was 0/0. The reaction index of the testing sample from Embodiment 16 was 0/0. The reaction index of the testing sample from Comparative Example 1 was 5/5.

Embodiment 19

Cytotoxicity Test B

This embodiment is a cytotoxicity test using MTT assay. Mouse fibroblast cells (CCRC 60091 NCTN Clone 929, of strain L) were implanted into each well of a 96-well plate and a minimum essential medium (MEM) containing 10% serum and 1% antibiotic was added to each well for cell culture. After the cells grew to a sub-confluent monolayer, 0.1 mL of test sample was added into part of the wells, and no other sample of the composite particles was added to the remaining wells do to act as a control group. Next, the 96-well plate was placed in an incubator with 5% carbon dioxide at 37° C. for 24 hours, and then MTT assay was conducted to analyze cell viability. One sample was investigated 3 times in total, and an average of the results was taken. In order to clearly describe the process of the testing, the product from Embodiment 8 will be used as an example to explain the preparation process. The product from Embodiment 16 and the product from Comparative Example 1 were also prepared for testing by the same process. 0.2 g of the product from Embodiment 8 was mixed with a minimum essential medium containing 10% serum and 1% antibiotic to form a solution with a 0.2 g/mL concentration. The cell viability of the testing sample from Embodiment 8 was 80.4±10.2%. The cell viability of the testing sample from Embodiment 16 was 99.4±8.6%. The cell viability of the testing sample from Comparative Example 1 was 35.4±4.9%.

The results from Embodiments 18-19 are shown in Table 2. The test samples using the silicon dioxide composite particles from Embodiment 8 and Embodiment 16 were investigated, and the reaction index of cytotoxicity was RI=0/0. The cell viability assays were 80.4±10.2% and 99.4±8.6%, respectively. These results show that the sample was not cytotoxic. Accordingly, the silicon dioxide composite particles prepared from the precursor disclosed in the present disclosure does indeed have very low biotoxicity, which makes it of great potential for extensive use in organisms.

TABLE 2

| silicon dioxide composite particles | Embodiment 8 | Embodiment 16 | Comparative example 1 |
|---|---|---|---|
| cytotoxicity test A | none RI = 0/0 | none RI = 0/0 | Yes RI = 5/5 |
| cytotoxicity test B | none cell viability was 80.4 ± 10.2% | none cell viability was 99.4 ± 8.6% | Yes cell viability was 35.4 ± 4.9% |

In summary, the organic silane precursor disclosed in the present disclosure can reduce the toxicity of silicon dioxide composite particles to organisms. Further, the long carbon chain of the organic silane precursor provides a steric barrier, which can prevent the alkoxysilane of the organic silane precursor from self-polymerization to form nanoparticles and improve stability. Accordingly, the present disclosure provides the organic silane precursor, the method for preparing the silicon dioxide composite particles by using the organic silane precursor, and the silicon dioxide composite particles prepared from the organic silane precursor to solve the problems of conventional techniques and increase the applicability of the silicon dioxide composite particles.

The above embodiments are given by way of illustration to help those skilled in the art to fully understand the spirit of the present application. Hence, it should be noted that the present application is not limited to the embodiments herein and can be realized by various forms. Further, the drawings are not a precise scale and components may be exaggerated in view of width, height, length, etc. Herein, the similar or identical reference numerals denote the similar or identical components throughout the drawings.

The invention claimed is:

1. An organic silane precursor for preparing a silicon dioxide composite particle, characterized in that the organic silane precursor is of the formula (I) A-$R^1$—Si($OR^2$)$_3$, wherein $R^1$ is a $C_{2-4}$ alkylene group,
$R^2$ is a $C_{1-2}$ alkyl group,
A is selected from

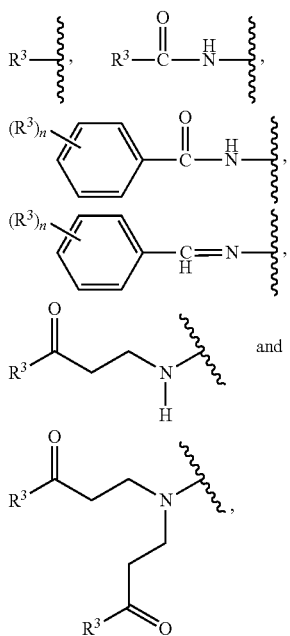

$R^3$ is an unsubstituted $C_{1-18}$ linear or branched alkyl group or alkoxyl group, and
n is a number of 1 to 5.

2. The organic precursor according to claim 1, wherein the alkoxyl group is

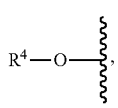

wherein $R^4$ is an unsubstituted $C_{1-18}$ linear or branched alkyl group.

3. A method for preparing a silicon dioxide composite particle by undergoing hydrolysis and condensation polymerization of the organic silane precursor according to claim 1 with a tetra-alkoxy silane, wherein the method is comprised of the following steps:

mixing the organic silane precursor and the tetra-alkoxy silane in an alcohol solvent to form a mixture; adding an alkaline solution to the mixture to undergo hydrolysis and condensation polymerization, and to produce another mixture with a solid;

filtering, washing and drying the solid particle to yield the silicon dioxide composite particle.

4. The method according to claim 3, wherein the tetra-alkoxy silane is a tetra ethoxysilane.

5. The method according to claim 3, wherein the alcohol solvent is an ethanol solution.

6. The method according to claim 3, wherein the alkaline solution is an ammonia solution.

7. A silicon dioxide composite particle with long carbon chains of the formula A-$R^1$on its surface, wherein the silicon dioxide composite particle is prepared by undergoing hydrolysis and condensation polymerization of an organic silane precursor with a tetra-alkoxy silane, comprising the following steps:

mixing the organic silane precursor and the tetra-alkoxy silane in an alcohol solvent to form a mixture;
adding an alkaline solution to the mixture to undergo hydrolysis and condensation polymerization, and to produce another mixture with a solid; and
filtering, washing and drying the solid to yield the silicon dioxide composite particle,
wherein the organic silane precursor is of the formula (I) A-$R^1$—Si($OR^2$)$_3$,
$R^1$ is a $C_{2-4}$ alkylene group,
$R^2$ is a $C_{1-2}$ alkyl group,
A is selected from

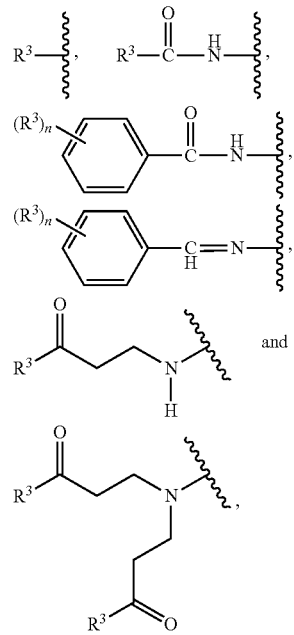

and
$R^3$ is an unsubstituted $C_{1-18}$ linear or branched alkyl group or alkoxyl group, and n is a number of 1 to 5.

* * * * *